(12) United States Patent
Mayer

(10) Patent No.: US 10,772,416 B2
(45) Date of Patent: Sep. 15, 2020

(54) ROTARY BRUSH MAIN PART AND ROTARY BRUSH

(71) Applicant: WashTec Holding GmbH, Augsburg (DE)

(72) Inventor: Stefan Mayer, Neusass (DE)

(73) Assignee: WashTec Holding GmbH, Augsburg (DE)

( * ) Notice: Subject to any disclaimer, the term of this patent is extended or adjusted under 35 U.S.C. 154(b) by 0 days.

(21) Appl. No.: 15/780,710

(22) PCT Filed: Dec. 2, 2015

(86) PCT No.: PCT/EP2015/002426
§ 371 (c)(1),
(2) Date: Jun. 1, 2018

(87) PCT Pub. No.: WO2017/092776
PCT Pub. Date: Jun. 8, 2017

(65) Prior Publication Data
US 2018/0352943 A1 Dec. 13, 2018

(51) Int. Cl.
A46B 3/08 (2006.01)
A46B 13/00 (2006.01)
(Continued)

(52) U.S. Cl.
CPC ............... *A46B 3/08* (2013.01); *A46B 3/16* (2013.01); *A46B 13/001* (2013.01);
(Continued)

(58) Field of Classification Search
CPC .... A46B 3/08; A46B 3/10; A46B 3/16; A46B 7/10; A46B 13/001; A46B 13/005;
(Continued)

(56) References Cited

U.S. PATENT DOCUMENTS

| 396,330 A | * | 1/1889 | Duncan | ........................... 15/151 |
| 1,237,087 A | * | 8/1917 | Parantau | ................. A47L 13/46 |
| | | | | 15/151 |

(Continued)

FOREIGN PATENT DOCUMENTS

| DE | 20211339 U1 | 12/2003 |
| DE | 10233055 A1 | 2/2004 |

(Continued)

OTHER PUBLICATIONS

International Preliminary Report on Patentability for PCT/EP2015/002426, filed Dec. 2, 2015 (English translation).
International Search Report dated Aug. 10, 2016 for PCT/EP2015/002426 filed Dec. 2, 2015.
Written Opinion for PCT/EP2015/002426 filed Dec. 2, 2015.

*Primary Examiner* — Mark Spisich
(74) *Attorney, Agent, or Firm* — Paul D. Bianco; Gary S. Winer; Fleit Intellectual Property Law

(57) ABSTRACT

A rotary brush for processing the surface of a vehicle includes a rotary brush main part and a plurality of fill material holders that are arranged on an outer lateral surface of the rotary brush main part spaced apart from one another in the circumferential direction thereof. Each fill material holder can be secured to the rotary brush main part in a plurality of stop positions spaced apart in the radial direction of the rotary brush main part.

10 Claims, 4 Drawing Sheets

(51) Int. Cl.
*A46B 3/16* (2006.01)
*B60S 3/06* (2006.01)

(52) U.S. Cl.
CPC .......... *A46B 13/003* (2013.01); *A46B 13/005* (2013.01); *B60S 3/06* (2013.01); *A46B 2200/3046* (2013.01)

(58) Field of Classification Search
CPC .......... A46B 13/006; A46B 2200/3046; A46B 13/003; B60S 3/06; B60S 3/063; B60S 3/066
USPC ...... 15/53.1–53.3, 97.3, 179, 183, 190, 194, 15/195, 198, 5, 230, 230.16, 230.17, 15/230.19, 151, 181
See application file for complete search history.

(56) References Cited

U.S. PATENT DOCUMENTS 2,859,464 A * 11/1958 Colangelo ............... A47L 13/46
15/151
4,104,756 A 8/1978 Gasser et al.
7,152,269 B1 * 12/2006 Windel .................... A46B 9/06
15/181

FOREIGN PATENT DOCUMENTS

EP 2932869 A1 10/2015
KR 100919923 B1 10/2009

* cited by examiner

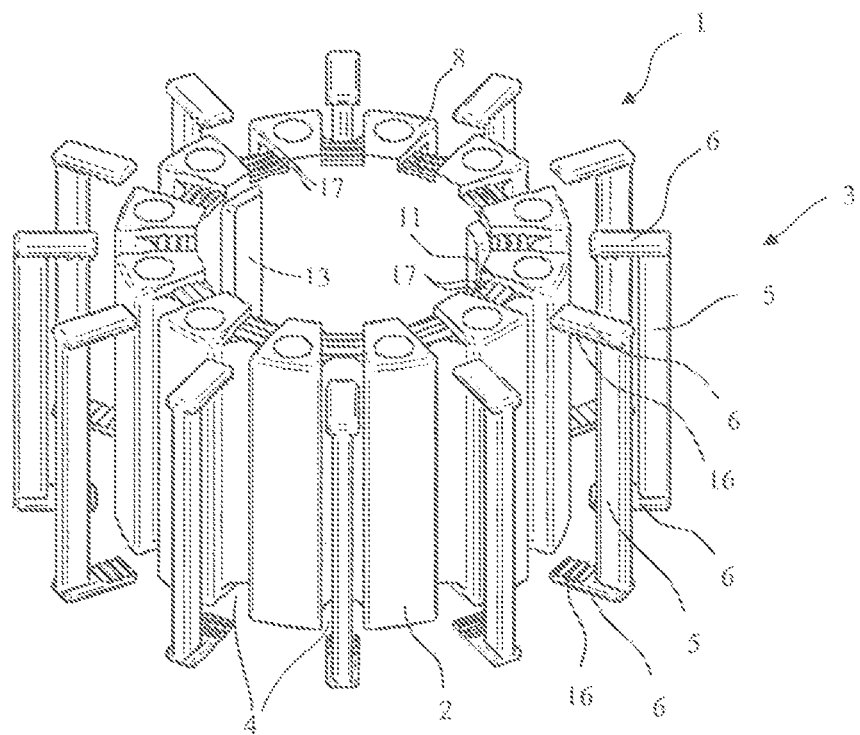
Fig. 1
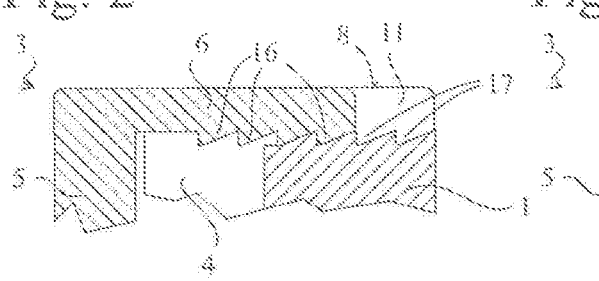
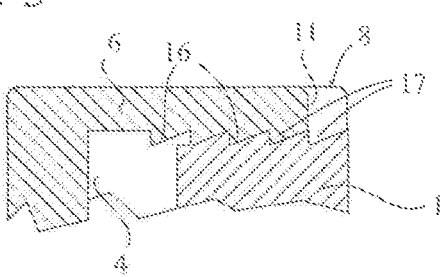
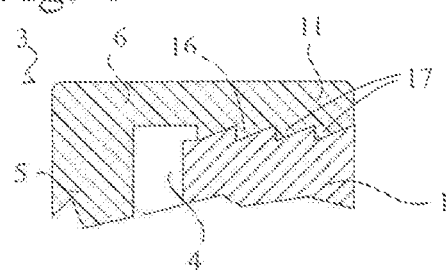
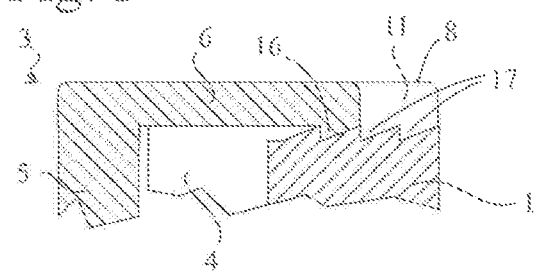

ROTARY BRUSH MAIN PART AND ROTARY BRUSH

FIELD OF THE INVENTION

The present invention relates to a rotary brush for processing the surface of vehicles.

BACKGROUND OF THE INVENTION

Car wash facilities for cleaning the exterior of vehicles are known from the prior art. These car wash facilities frequently comprise a plurality of rotary brushes which are fitted with a brush fill material in the form of cleaning brushes or cleaning cloth strips and which, as they rotate about their longitudinal axis, remove dirt from the surface of the car to be cleaned. However, the production of these rotary brushes is responsible for a large part of the production costs of the car wash facility, since, due to the complex mounting operations, the fill materials have thus far been mounted manually on the rotary brushes, which is also very time-consuming.

U.S. Pat. No. 4,104,756 discloses a rotary brush on which the cloth strips are secured to a rotary brush base body. To secure the cloth strips to the rotary brush base body, a plurality of fill material holders are disposed on the outer lateral surface of the rotary brush base body and spaced apart from each other in the circumferential direction. When a cloth strip is mounted, first a rib-like member of the fill material holder is routed through a loop on the end of the cloth strip. The loop on the end of the cloth strip, together with the rib-like member, is then inserted into a longitudinal groove of the rotary brush base body, thereby causing the cloth strip and the fill material holder to form-fittingly engage in the rotary brush base body. If wrinkles form as the cloth strip is being inserted, the fill material holder becomes stuck, it must be pulled out, and a new attempt at mounting must be made. Since this operation has to be carried out individually for each cloth strip on the rotary brush, the complete operation of mounting a rotary brush entails considerable time and monetary expense. In addition, this type of fill material holder is not suitable for mounting and securely holding cloth strips of different material thicknesses, since, with this rigid system, it is not possible to adjust the holding power or holding position.

SUMMARY OF THE INVENTION

One aspect of the present invention relates to a rotary brush which allows fill materials of different material thicknesses to be quickly and easily mounted.

Advantageous embodiments of the invention are also disclosed.

The rotary brush according to the present invention is characterized in that each fill material holder can be secured to the rotary brush base body in a plurality of stop positions spaced apart from each other in the radial direction of the rotary brush base body. Since the distance between the rotary brush base body and the fill material holder differs in each of these positions, each of these stop positions is suitable for attaching a brush fill material of different material thicknesses.

To attach the brush fill material, it suffices if this material is clamped between the rotary brush base body and the fill material holder.

To achieve quick and easy automated mounting of the brush fill material and, if desired, to automate the mounting operation, the rotary brush base body and each fill material holder preferably comprise interacting locking means both on the base body side and on the fill material holder side, and the stop positions are preferably locking positions of the locking means. Thus, the mounting operation can be carried out by radially moving a fill material holder from the outside to the inside through the successive locking positions until the resistance of the brush fill material, which is clamped between the rotary brush base body and the fill material holder, prevents the fill material holder from advancing further. When such a stop position is reached, the fill material holder can be released; the pressure of the fill material subsequently drives the fill material holder back into the last traversed locking position where it is held in a fixed position. In this type of mounting operation, there is no risk of forming wrinkles in the fill material.

One of the locking means can have a plurality of locking notches spaced apart from each other in the radial direction of the rotary brush base body, with a locking lug of the other locking means in each locking position engaging in one of these locking notches. It is immaterial whether the plurality of locking notches is part of the locking means on the base body side and the locking lug is part of the locking means on the fill material holder side or vice versa.

The fill material holders preferably comprise each a rib-like member extending along an axial direction of the rotary brush base body and at least one arm which projects from the rib-like member in the radial direction of the rotary brush base body and which carries the locking means on the fill material holder side.

An arm with a locking means on the fill material holder side can be disposed on each end of the rib-like members; however, it is also conceivable to connect one end of a rib-like member to the rotary brush base body by means of a hinge that can preferably be disassembled.

Preferably easily accessible locking means on the base body side are disposed on at least one end face of the rotary brush base body, and in the event that the fill material holders have an arm on each end of the rib-like members, preferably on both end faces.

Between two locking positions, the arm should pass a position in which it is elastically deflected. The fill material holder is then held in the locking position not only by the elastic force of the brush fill material, but also by its own elastic force.

The arm in the elastically deflected position is preferably deflected outwardly in the axial direction of the rotary brush base body.

The arm can preferably extend over an end face of the rotary brush base body. It this area, it is readily accessible, so that the locking means, if required, can be detached, for example, to replace the brush fill material.

Furthermore, if a rotary brush comprises a plurality of rotary brush main bodies, all of which rotate about a common axis, the arm extending over an end face of the first rotary brush base body can be axially secured between the first and a second rotary brush base body. It is not necessary for the second rotary brush base body to hold the arm in an axially completely immobile position; it suffices that the mobility of the arm is restricted to such an extent that the second rotary brush base body prevents it from reaching the position of maximum elastic deflection between two locking positions.

When the arm in the locking position is recessed in a groove on an end face of the first rotary brush base body, the end faces of the rotary brush main bodies can lie one on top of the other between the grooves, so that the lower rotary brush base body can fully and stably support the upper rotary brush base body.

An axial deflection of the arm, which is necessary for the arm to move from one locking position to the next, should be greater than the deflection between the locking position and a position flush with the end face, so that the arm can be prevented from leaving its locking position by an end surface of the second rotary brush base body, which end surface covers the groove. On the other hand, however, the deflection should preferably not be greater than twice the deflection between the locking position and the position flush with the end face, due to the fact that even if the end faces of two rotary brush main bodies abut one another, the fill material holders can be radially inserted into their locking positions from the outside, provided the grooves of the oppositely lying end faces overlap each other.

To secure the arms in the locking position, the arm can have a through-passage into which a bolt can be inserted in the axial direction. The securing effect can be based on a contact of the bolt with an inside surface of the through-passage; however, the bolt can also have a head which abuts a surface of the arm facing away from the rotary brush base body and thereby blocks the elastic deflection of the arm.

To block the arm by abutting the surface facing away from the rotary brush base body, the bolt need not necessarily engage in a through-passage of the arm; it suffices if the foot of the bolt is anchored in the rotary brush base body.

However, if such a bolt, which blocks the arm with its abutting head, passes through a through-passage of the arm, this through-passage is preferably configured in the form of an oblong hole or slot so as to allow a move between different locking positions, without having to detach the bolt completely from the rotary brush base body.

To make mounting especially quick and cost-effective, the arm can also be welded to the rotary brush base body.

To facilitate a radial orientation of the fill material projecting from the rotary brush base body, the fill material holders can engage in longitudinal grooves on the outer lateral surface of the rotary brush base body.

BRIEF DESCRIPTION OF THE DRAWINGS

Additional characteristic features and advantages of the invention follow from the description of preferred embodiment examples below with reference to the drawings. In the drawings:

FIG. 1 shows a perspective view of a rotary brush base body and the associated fill material holders according to a first embodiment example;

FIG. 2 shows a radial section through an arm of a fill material holder in a first locking position on the rotary brush base body;

FIG. 3 shows the arm in a second locking position;

FIG. 4 shows the arm in a fourth [sic] locking position;

FIG. 5 shows a section similar to that in FIG. 2 according to a second configuration;

DETAILED DESCRIPTION OF THE INVENTION

Figure 6:
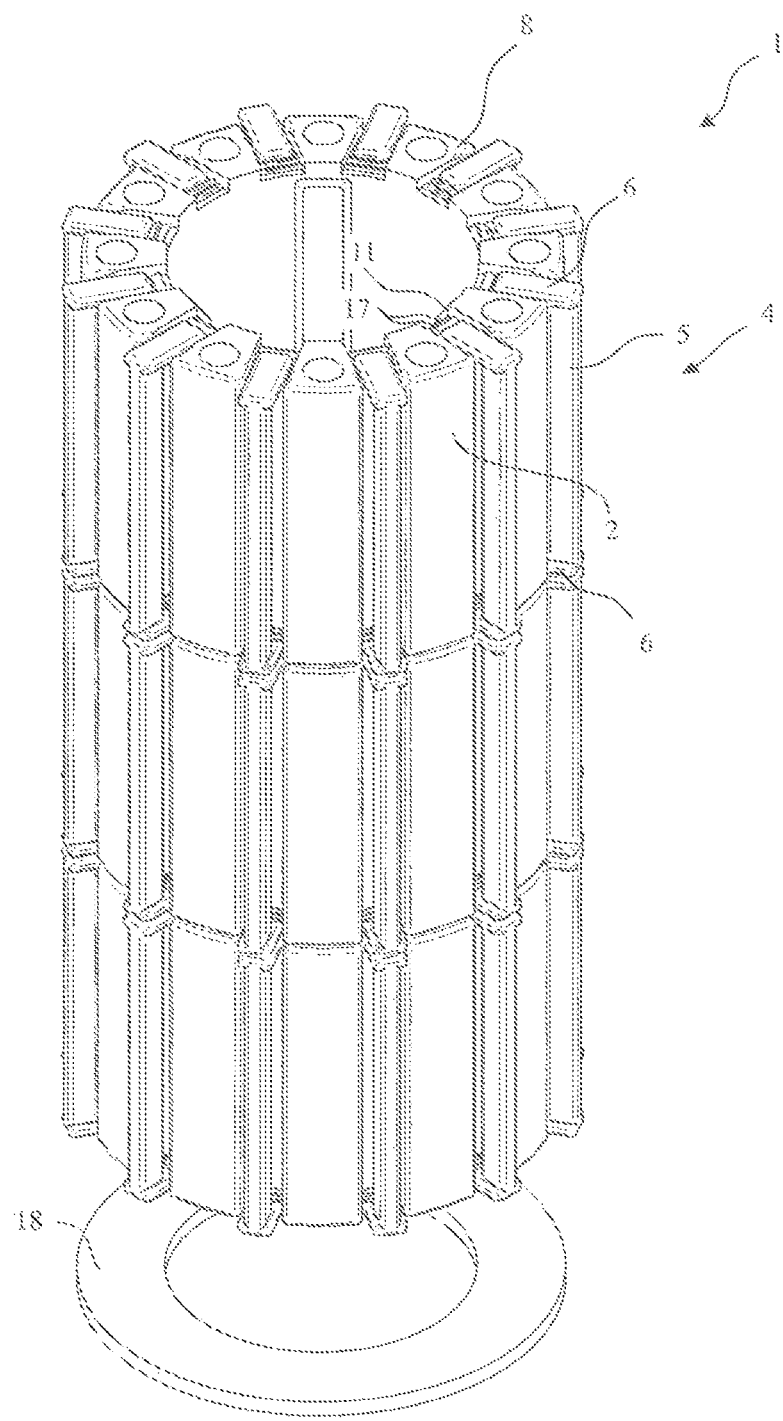
FIG. 6 shows a perspective view of a rotary brush according to the present invention without fill material.

FIG. 1 shows an exploded perspective view of a rotary brush base body 1 and a fill material holder 3 for a rotary brush for use in a conveyor tunnel car wash for passenger vehicles. The rotary brush base body 1 has the form of a cylindrical ring. Longitudinal ribs 13 on an inner lateral surface of the ring ensure a positive connection to a shaft (not shown in the figure). Axial grooves 4 extending in the direction of the cylinder axis are uniformly distributed in the circumferential direction along the outer lateral surface 2 of the rotary brush base body 1. On the end faces 8 of the rotary brush base body 1, the axial grooves 4 merge into radial grooves 11 which extend toward the cylinder axis. The bottom of each radial groove 11 has a saw-toothed profile with a plurality of locking notches 17 sequentially following each other in the radial direction.

The fill material holders 3 comprise each a rib-like member 5, where the length of the rib-like member is consistent with the length of the axial grooves 4 and where the cross section of the rib-like member is dimensioned such that, when a fill material holder 3 is mounted on the rotary brush base body 1, the rib-like member engages in the axial groove 4 maintaining its all-around clearance, so that all around the rib-like member 5, there is a free through-passage in which a brush fill material can be secured by clamping it between the rib-like member 5 and the inner surface of the axial groove 4. Projecting at right angles from the ends of the rib-like member 5 are two arms 6, the inner surfaces of which face one another, each having at least one locking lug 16.

The fill material elements (not shown in the figure) can be bristles, tufts or cloth strips. During the assembly of the rotary brush, these elements can initially be laid over the horizontally held rib-like member, so that they hang down on both sides. When the fill material holder 3 is subsequently moved toward an axial groove 4 of the rotary brush base body 1, the cylinder axis of which is also horizontally oriented, the arms 6 engage in the radial grooves 11 and are elastically spread apart when their locking lugs 16 slide over a ramp of the saw-tooth profile of the axial grooves 11. A first locking position is reached as soon as the first ramp has been past and the locking lugs 16 engage in the radially outermost lying locking notch 17 of the axial grooves 4. Additional locking positions are defined by the engagement of the locking lugs 16 in radially more inwardly stepped locking notches 17. The locking position, up to which the arms 6 can advance into the radial grooves 11, depends on the material thickness of the fill material elements.

FIG. 2 shows a radial section through an arm 6 of one of the fill material holders 3 and the radial groove 11 in which the arm engages. The fill material holder 3 is positioned in the outermost of a total of three possible locking positions; the other two positions are shown in FIGS. 3 and 4. The number of the locking positions can be varied; the less elastically compressible the fill material, the more closely spaced should be the locking positions in order to ensure secure clamping of the fill material elements.

In the configuration of FIG. 5, the more deeply the arms 6 advance into the radial grooves 11, the more widely spread apart must be the arms 6, so that the inwardly lying locking positions can be reached only with the exertion of considerable force. In the variant shown in FIG. 3, a single locking lug 16 of the arm 6 is positioned opposite to a plurality of locking notches 17 in the radial groove 11 such that the deflection required for moving from one locking position to the next is always the same.

As FIGS. 2 to 5 indicate, in the locking positions, the outer surfaces of the arms 6 lying opposite to the locking lugs 16 are flush with an end face 8 of the rotary brush base body 1. As a result, if a plurality of rotary brush main bodies 1, fitted with fill material holders 3, are, as illustrate in FIG. 6, stacked one on top of another in order to form a complete rotary brush, the arms 6, at least on the abutting end faces 8, are undetachably arrested in the radial grooves 11. On the exposed end faces 8 on the upper and the lower end of the rotary brush, the arms 6, if necessary, can be secured by mounting a cover ring 18.

Figure 7:
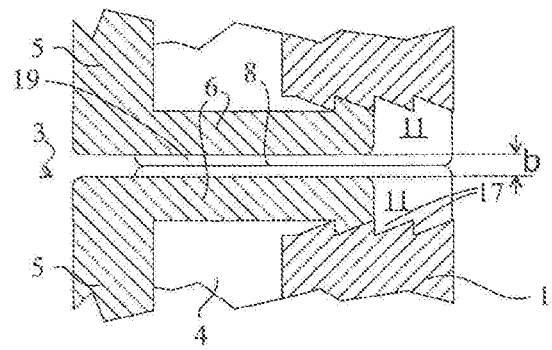
FIG. 7 shows a radial section through the arms of two adjacent fill material holders on two rotary brush main bodies abutting one another according to a third configuration.
Figure 8:
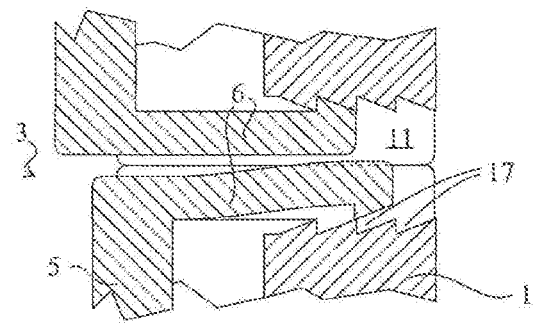
FIG. 8 shows a second section through the arms seen in FIG. 7, wherein one of the arms is in an elastically deflected position between locking positions.

FIG. 7 shows a section through a rotary brush according to another variant of the invention. The end faces 8 of the two rotary brush bodies 1 are positioned one on top of another. However, in this variant, the outer surfaces of the arms 6 are not flush with the end faces 8, but are set back behind said end faces, thereby leaving an open gap 19 between the oppositely lying outer surfaces, the axial dimension b of which gap 19 is greater than the maximum deflection that an arm 6 undergoes as it moves into the next adjacent locking position. As a result, it is possible, as shown in FIG. 8, to move the fill material holders 3, as needed, into a radially more inwardly lying position and to clamp the fill material subsequently more securely between the rotary brush base body 1 and the fill material holder 3, without having to disassemble the rotary brush or dismantle it from a car wash facility in which it is used.

Figure 9:
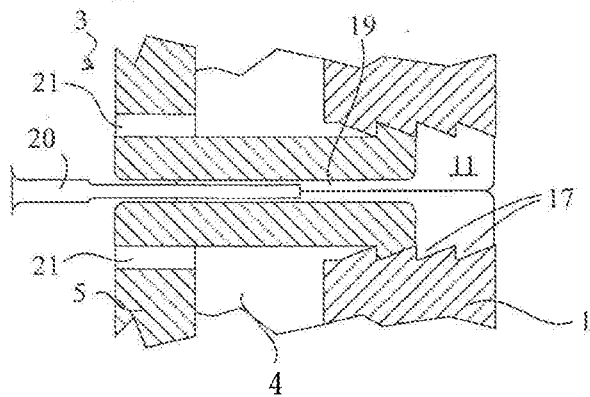
FIG. 9 shows a section similar to that in FIG. 7 according to the fourth configuration.

To rule out the possibility of the arms 6 escaping from the locking positions during the washing operation, a locking wedge 20 can be driven into the gap 19 as shown in FIG. 9.

Furthermore, in the transition region between the arms 6 and the rib-like members 5, the fill material holders 3 can have a radial bore 21, through which a tool, such as a screwdriver, can be inserted between the arm 6 and the bottom of the radial groove 11 so as to lift the arm 6 off the bottom and to disengage the locking lug 16 from the locking notch 17. In this manner, the fill material holder 3 can be detached from the rotary brush base body 1, again without having to dismantle the rotary brush, and a worn-out fill material can be replaced.

Figure 10:
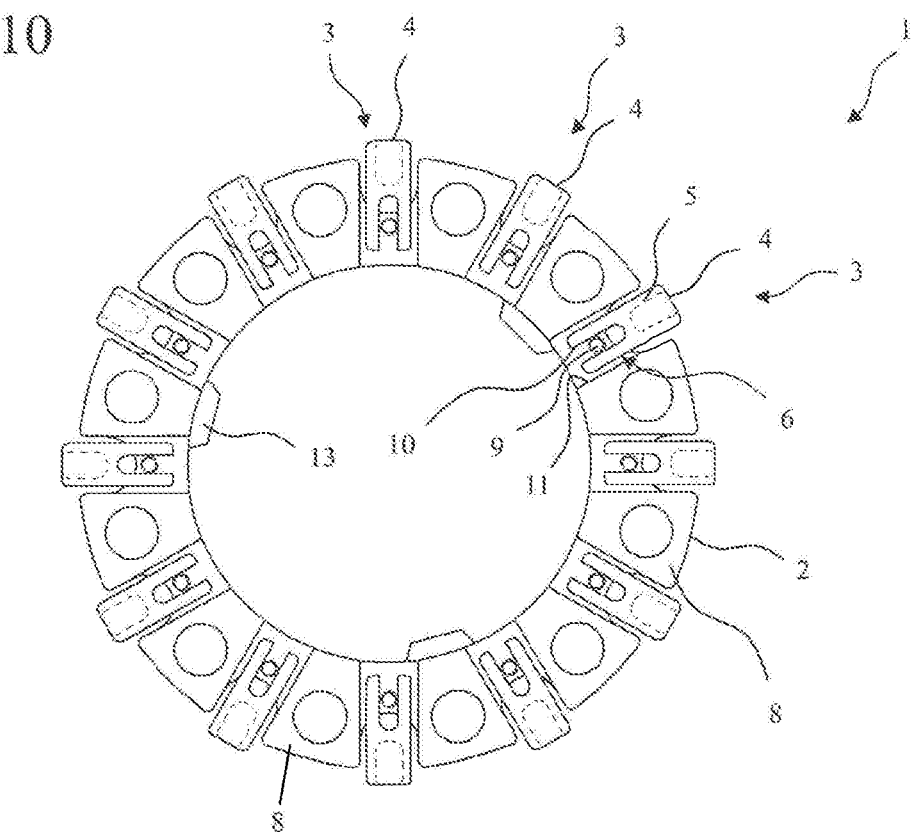
FIG. 10 shows a top view in the axial direction of a rotary brush according to a fifth configuration of the invention.

FIG. 10 shows a top view in the axial direction of a rotary brush according to a fifth configuration of the invention. The fill material holders 3 differ from the configurations presented above in that the arms 6 each have a radially extending slot 10. When looking through the slot 10, a hole 9 can be seen on the bottom of the radial groove 11. A bolt or screw 22 can be threaded into this hole 9, the head of which keeps the arm 6 pressed against the bottom of the groove 11, thereby securing the arm 6 in its locked position.

Figure 11:
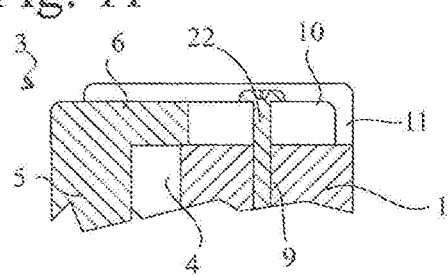
FIG. 11 shows a section similar to that in FIG. 2 according to a modification of the fifth configuration.

According to a variant of the configuration shown in FIG. 11, the bottom of the radial groove 11 and the inner surface of the arm 6, which is pressed by the bolt 22 against the bottom of the radial groove 11, are flat. This allows the arm 6 to be locked not only discrete locking positions, but in any position in which the brush fill material is sufficiently securely clamped between the rotary brush base body 1 and the fill material holder 3.

LIST OF REFERENCE NUMERALS

1 Rotary brush base body
2 Outer lateral surface
3 Fill material holder
4 Axial groove
5 Rib-like member
6 Arm
8 End face
9 Hole
10 Slot
11 Radial groove
13 Longitudinal rib
16 Locking lug
17 Locking notch
18 Cover ring
19 Gap
20 Locking wedge
21 Bore
22 Screw

The invention claimed is:

1. A rotary brush for processing a surface of a vehicle, the rotary brush comprising:
   a first rotary brush base body; and a first plurality of fill material holders disposed on an outer lateral surface of the first rotary brush base body and spaced apart from each other in a circumferential direction thereof, in which the first rotary brush base body and each of the first plurality of fill material holders comprises interacting locking elements with first and second components, wherein each of the first plurality of fill material holders is securable to the first rotary brush base body in a plurality of stop positions spaced apart from each other in a radial direction of the first rotary brush base body; and
   a second rotary brush base body and a second plurality of fill material holders disposed on an outer lateral surface of the second rotary brush base body and spaced apart from each other in a circumferential direction thereof, wherein the second rotary brush base body is arranged adjacent an end face of the first rotary brush base body and oriented along an axial direction of the first rotary brush base body,
   wherein the stop positions are locking positions of the locking elements,
   wherein the first component of the locking element comprises a plurality of locking notches spaced apart from each other in the radial direction of the first rotary brush base body and the second component of the locking element comprises a locking lug which engages in one of the locking notches of the first component,
   wherein each of the first plurality of fill material holders has a rib-like member extending along an axial direction of the first rotary brush base body and a first arm projecting from a first end of the rib-like member in the radial direction of the first rotary brush base body, the first arm including the locking lug, and
   wherein the first arm extends over the end face of the first rotary brush base body and is axially secured between the first rotary brush base body and the second rotary brush base body.

2. The rotary brush of claim 1, wherein a brush fill material is clamped between the first rotary brush base body and each of the first plurality of fill material holders.

3. The rotary brush of claim 1, further comprising a second arm projecting from a second end of the rib-like member in the radial direction of the first rotary brush base body, the second arm also including the second component of the locking elements on the fill material holder side of the rotary brush.

4. The rotary brush of claim 1, wherein the first component of the locking elements on a rotary brush base body side of the rotary brush are disposed on at least one end face of the first rotary brush base body.

5. The rotary brush of claim 1, wherein between two locking positions, the first arm assumes an elastically deflected position.

6. The rotary brush of claim 5, wherein in the elastically deflected position, the first arm is outwardly deflected in the axial direction of the first rotary brush base body.

7. The rotary brush of claim 1, wherein the first arm when in a locking position is recessed in a radial groove on the end face of the first rotary brush base body.

8. The rotary brush of claim 7, wherein an axial deflection of the first arm, which is necessary for the first arm to move from one locking position to the next locking position, is greater than deflection between the locking position and a position that is flush with the end face.

9. The rotary brush of claim 8, wherein the axial deflection of the first arm is no greater than twice a deflection between the locking position and the position that is flush with the end face.

10. The rotary brush of claim 1, wherein each of the first plurality of fill material holders engages in a longitudinal groove on the outer lateral surface of the first rotary brush base body.

* * * * *